United States Patent Office 3,093,619
Patented June 11, 1963

3,093,619
NEW ALLYLIC RESIN COMPOSITIONS
Bert S. Taylor, New York, N.Y., James L. Thomas, Baltimore, Md., and Charles A. Heiberger, Princeton, N.J., assignors to FMC Corporation, a corporation of Delaware
No Drawing. Filed Jan. 24, 1961, Ser. No. 84,502
12 Claims. (Cl. 260—78.5)

This invention relates to new allylic resin compositions and particularly to new allylic copolymers having outstanding mechanical and electrical properties, as well as exceptional flame retardant properties.

A class of resins which has found many useful applications is the class of polymeric diallylic esters of carbocyclic dicarboxylic acids; typically, the polydiallylic phthalates and related compounds. These diallylic esters have the property of being capable of polymerization in more than one step, forming an intermediate, stable, incompletely cured thermoplastic polymer which contains residual unsaturation and which when completely cured forms a thermoset, infusible resin.

The intermediate thermoplastic polymer, sometimes called a "prepolymer," is readily formulated for use in standard polymer applications. The completion of the cure of the prepolymer is then carried out in situ, to produce a cross-linked, infusible product. This technique is of value because virtually all of the shrinkage which normally accompanies polymerization occurs during the formation of the prepolymer, so that negligible shrinkage occurs during final cure. Because of this resistance to shrinkage, as well as their excellent electrical properties, polymers of this class have found particular utility in such applications as the potting and encapsulating of electrical components, since the loosening of contacts and loss of insulation resistivity which results from post-mold shrinkage is avoided, as well as in laminates and other polymer applications requiring excellent mechanical and electrical properties and volume stability.

Despite the suitability of polydiallyl phthalate resins for these applications, these resins have the inherent disadvantage of inadequate flame-retardancy under extreme conditions, such as conditions where sparks and high temperatures may be encountered. Further, the incorporation of standard flame retardant agents into diallyl phthalate resin formulations has been found to degrade the mechanical and electrical properties needed to meet the high standards of performance required in certain applications. Heretofore, no method for improving both the heat resistance and flame-retardance of diallyl phthalate resins, without loss in mechanical and electrical performance, has been provided.

The primary object of this invention, therefore, is to provide thermoset diallylic resin compositions that are both flame retardant and highly resistant to degradation at elevated temperatures. Another object is to provide in commerce thermoplastic prepolymer compositions particularly adapted to uses requiring a high degree of temperature stability and retention of mechanical and electrical properties. Another object is to provide improved methods for obtaining these compositions. These and other objects and advantages of the present invention will become evident from the following description.

We have discovered that copolymers containing diallyl phthalate or isomers thereof, and about 5% to about 50% of diallyl 1,4,5,6,7,7-hexachlorobicyclo-(2.2.1)-5-heptene-2,3-dicarboxylate (commonly called diallyl chlorendate), not only are flame retardant, but also exhibit enhanced flexural strengths and temperature stability, as well as improvements in electrical properties, as compared with either component alone. Further, these compositions are characterized by a rapid rate of cure to the thermoset state, and a high tolerance for inert fillers, both of which advantages are of substantial practical importance. In short, we have found that these new resinous compositions have a combination of properties which is superior to the properties of either component alone, and of greatly enhanced utility.

It is known that highly chlorinated polymers tend to exhibit flame retardancy. However, when thermoset polydiallyl chlorendate is exposed to elevated temperatures for prolonged periods the resin is degraded, suffering substantial losses in flexural and tensile strength, and thus is of limited utility in applications where repeated or constant exposure to elevated temperatures is encountered. We have found that the particular combination of diallyl chlorendate with diallyl phthalate and isomers thereof imparts unexpected advantages and utility to this combination, as will hereinafter be demonstrated.

We have further found that a markedly enhanced flame retardant effect is noted when about 5% to about 20%, by weight of total resin, of antimony trioxide is added to the combination of diallyl chlorendate with diallyl phthalate. Antimony trioxide is a known flame retardant, wet when antimony trioxide is added to diallyl phthalate resin alone there is observed no useful flame retardant effect, while the elevated temperature stability of the product is degraded. When both antimony trioxide and diallyl chlorendate are present, both the flame retardance and the mechanical properties of the combination at elevated temperature are improved, and less diallyl chlorendate need be present to effect this improvement.

Diallyl chlorendate may be prepared by esterifying 1,4,5,6,7,7-hexachlorobicyclo - (2.2.1) - 5-heptene-2,3-dicarboxylic acid or acid anhydride with allyl alcohol. Procedures for preparing this compound are described in U.S. Patent 2,810,712 to Baranauckas. The other diallyl esters described herein are also known compounds.

In accordance with this invention, diallyl chlorendate and diallyl phthalate or isomers thereof are combined, to form a thermoset resinous product containing about 5% to about 50% of diallyl chlorendate by weight of resin. In practice, at least about half of the total resin is derived from the thermolastic prepolymer form of the diallyl monomer, to avoid undue shrinkage during final cure. The diallyl chlorendate and the diallyl phthalate may be introduced into the combination in a variety of ways. For example, diallyl chlorendate monomer may be combined with a thermoplastic diallyl phthalate prepolymer before final cure; or the diallyl chlorendate may be introduced as a prepolymer itself or as a component of a thermoplastic copolymer with diallyl phthalate. Many other variations of these combinations are of course possible: for example, the prepolymer may be a copolymer of diallyl chlorenate and diallyl phthalate in other than the proportions desired in the final product, which proportions are obtained by combining the requisite amount and kind of monomer with the prepolymer before final cure. A mixture of homopolymers may be used to comprise the prepolymer. The added monomer may be either diallyl chlorendate or diallyl phthalate or mixtures thereof, which monomer is mixed with the appropriate prepolymer.

These thermoplastic polymers and copolymers may be prepared by methods well known and fully described in the literature. Briefly, the diallyl monomer or mixture of monomers is polymerized, either thermally or in the presence of a free radical initiator, in the presence or absence of a solvent, to a thermoplastic prepolymer. The polymerization is terminated before gelation of the reaction mix occurs, such termination being effected by standard means, such as lowering the temperature, quenching the reactants, or adding a chain-terminating agent. The prepolymer is then separated from unreacted monomer. Procedures for carrying out these reactions are described in U.S. Patent 2,273,891 to M. A. Pollack and F. Strain. A preferred process is described in U.S. application Serial No. 814,957 of C. A. Heiberger. Prepolymers produced by these processes are thermoplastic and normally have a number average molecular weight above 2500 and below 25,000, generally below 10,000. They contain residual unsaturation and are readily polymerized further, in the presence or absence of additional monomer, and usually in the presence of a peroxide catalyst, to form a cross-linked, thermoset resin.

The prepolymers may be formulated as molding powders, laminating solutions, premixes, etc., depending on the desired end use. Standard recipes may be used. Molding powders may contain the usual fillers and reinforcing agents. Laminating solutions are readily prepared, since the thermoplastic prepolymers are readily soluble in low molecular weight ketones, benzene, ethyl acetate and other solvents. A minor amount of monomer may be included in these formulations, up to about 50% of the total resin, although it is not essential. A catalytic amount of a peroxide catalyst is also usually included, for more rapid cure at a lower temperature than if the final cure were thermally induced. Useful catalysts for this step include organic peroxides and hydroperoxides such as benzoyl peroxide and tertiary-butyl hydroperoxide, inorganic peroxides such as hydrogen peroxide and sodium peroxide, di(tertiary alkyl)peroxides such as dicumyl peroxide, and mixtures thereof, as well as many other catalysts which have been described in the literature. Such catalysts are used in the proportion of 0.01 to 10 percent depending on the efficiency of their action and whether or not substances which inhibit polymerization are present in the mixture to be cross-linked. Other additives, such as internal release agents, dyes, pigments and other agents used to impart particular properties, may be present.

Typical methods for preparing and using the improved compositions of this invention are illustrated in the following specific examples, which are merely exemplary of the practice of this invention and are not to be construed as limiting.

The mechanical properties of the resins were determined by generally accepted standard ASTM procedures. Flexural strength was measured by ASTM method D790-58T; tensile strength was measured by ASTM method D638-58T; edgewise compressive strength by ASTM method D695-54. Flame retardant properties were determined by ASTM test method D635-56T, and burning rates, reported in inches per minute, were measured by ASTM test method D757-49, the "Globar" method which is a severe test designed to evaluate materials found to be self-extinguishing by ASTM method D635-56T. All parts are by weight unelss otherwise indicated.

*Example 1*

A prepolymer of diallyl orthophthalate was prepared as follows: 8860 pounds of diallyl orthophthalate monomer was mixed with 75 pounds of hydrogen peroxide (added as a 50% aqueous solution) and 662 pounds of isopropanol, and heated with stirring at 104–108° C. for 10 hours, at which point the reaction mass had reached a viscosity of 27 cps. at 106° C. The polymer was precipitated with isopropanol, separated, and dried to give a 27.6% yield of solid resin having a viscosity of 354 cps. at 25° C. measured as a 25% solution in diallyl phthalate, softening range of 80–105° C. and iodine number of 55.

A filled resin was prepared as follows: To 95 parts of this prepolymer was added 5 parts of diallyl chlorendate monomer and 3 parts of t-butyl perbenzoate. This mixture was compounded in a ball mill for 16 hours with 70 parts of calcium carbonate, 70 parts of titanium-calcium pigment containing 30% titanium dioxide and 70% calcium sulfate, 3 parts of chrome yellow pigment, and 2 parts of lauric acid as mold release agent. Twenty parts of asbestos fiber was added during the last 2 hours of milling. This product was transfer molded at 150° C. under 8000 p.s.i. pressure for 2 minutes, in bars ¼" x ½" x 5". These bars were self-extinguishing by ASTM method D635–56T, and had a burning rate of 0.23 inch per minute by ASTM D757–49. The product exhibited a flexural strength of 12,900 p.s.i. and heat distortion temperature of 182° C.

Repeating this procedure, replacing the diallyl chlorendate with diallyl orthophthalate monomer, yielded a product which had a burning rate of 0.31 inch per minute by ASTM D757–49, flexural strength of 11,400 p.s.i. and heat distortion temperature of 153° C.

*Example 2*

The following example illustrates the accelerated cure obtained when minor proportions of diallyl chlorendate are present: To 90 parts of the prepolymer produced in Example 1 was added 10 parts of diallyl chlorendate monomer, 4 parts of t-butyl perbenzoate and 3 parts of lauric acid to facilitate mold release. This mixture was compounded in a ball mill for 16 hours with 110 parts of calcium carbonate, 70 parts of a titanium-calcium pigment containing 30% titanium dioxide and 70% calcium sulfate, 10 parts of colloidal silica, 3 parts of lead chromate pigment, and 40 parts of asbestos. This product was transfer molded at 150° C. under 16,000 p.s.i. for 30 seconds, in bars ¼" x ½" x 5". These bars were self-extinguishing by ASTM method D635–56T, and had a flexural strength of 11,500 p.s.i. and heat distortion temperature of 192° C. Increasing the cure time to 2 minutes did not significantly increase the degree of cure.

Repeating the above experiment, replacing the diallyl chlorendate with diallyl orthophthalate monomer, yielded a product which was not self-extinguishing by ASTM D635–56T, and had a flexural strength of 8500 p.s.i. and heat distortion temperature of 115° C. Increasing the cure time for this sample to 2 minutes raised the flexural strength to 10,600 p.s.i. and the heat distortion temperature to 152° C., showing that the sample had been incompletely cured at 30 seconds. Longer cure times did not substantially affect the properties of this resin.

*Example 3*

A laminating solution was prepared as follows: 450 parts of the diallyl phthalate prepolymer prepared in Example 1, 150 parts of diallyl chlorendate and 18 parts t-butyl perbenzoate were dissolved in 410 parts of methyl isobutyl ketone. Twelve plies of No. 181 glass cloth with a methacrylato chromyl chloride finish (Volan A) were impregnated with this solution. The solvent was evaporated and a 12 ply layup of the glass cloth was pressed at 150° C. at 100 p.s.i. for 30 minutes. The laminate thus produced was self-extinguishing by ASTM test D635–56T, and exhibited a burning rate of 0.10 inch per minutes by ASTM D757–49. The flexural strength of the laminate was 75,900 p.s.i., flexural modulus 3,090,000 p.s.i. and flexural elongation 2.49%.

Repeating the above procedure, replacing the diallyl chlorendate with 50 parts of diallyl phthalate monomer, yielded a product which was judged "burning" when subjected to ASTM test D635–56T, at a rate of 0.52 inch per minute by ASTM test D757–49, and had a flexural strength of 74,000 p.s.i., flexural modulus of 2,880,000 p.s.i. and flexural elongation of 2.81%.

*Example 4*

To 95 parts of the diallyl orthophthalate prepolymer prepared in Example 1 was added 5 parts of diallyl chlorendate monomer, 5 parts of antimony trioxide, and 3 parts of t-butyl perbenzoate. The materials were blended in acetone, the acetone was evoporated and the mixture was compression molded into bars 5" x ¼" x ½", for 15 minutes at 160° C. and 8000 p.s.i. The cured bars were self-extinguishing when subjected to ASTM test D635–56T, and had a burning rate of 0.24 inch per minute by ASTM test D-757–49.

For comparison, 95 parts of this prepolymer was blended with 5 parts of diallyl orthophthalate and 3 parts t-butyl perbenzoate, and molded and cured as above. The cured bars were judged "burning" by ASTM D635–56T, and burned at a rate of 0.65 inch per minute by this test.

*Example 5*

A prepolymer of diallyl chlorendate was prepared as follows: to a reactor was charged 500 parts of diallyl chlorendate monomer, 20 parts of methanol and 1.25 parts of t-butyl perbenzoate. The mixture was refluxed for 40 minutes at 100° C., to form a product which, when cooled at 25° C., had a viscosity of 110 poises. To 115 parts of this mixture was added two successive portions of 400 parts of methanol, thereby precipitating 23 parts of diallyl chlorendate prepolymer. The polymer was separated, washed and dried. The polymer had a softening point of 80° C. and a viscosity of 215 centipoises dissolved at a 25% concentration in diallyl phthalate at 25° C.

Forty-five parts of this prepolymer of diallyl chlorendate was mixed with 45 parts of the diallyl phthalate prepolymer prepared in Example 1, and to this was added 10 parts of diallyl phthalate monomer, 3 parts of t-butyl perbenzoate and 10 parts of antimony trioxide. A total of 240 parts of inert filler, containing 40 parts of asbestos, 110 parts of calcium carbonate and 70 parts of titanium-calcium pigment containing 30% titanium dioxide and 70% calcium sulfate was added, the formulation was blended in a ball mill and transfer molded at 150° C. under 8000 p.s.i. pressure for 2 minutes. The cured product has a flexural strength of 13,200 p.s.i, was non-burning by ASTM method D635–56T, and has a burning rate of 0.08 inch per minute by ASTM method D757–49.

For comparison, the diallyl chlorendate prepolymer alone was mixed with filler and t-butyl perbenzoate catalyst as above. However, attempts to prepare molded speciments were unsuccessful, due to the formation of cracks, bubbles, and blisters. The molded products were brittle, and shattered under the weight of a Rockwell M hardness impressor.

*Example 6*

A pre-copolymer was prepared as follows: 100 parts of diallyl phthalate monomer and 33.3 parts of diallyl chlorendate monomer were mixed with 0.15 part t-butyl hydroperoxide and 0.5 part of 100% hydrogen peroxide and heated with stirring at 120° C. for 7 hours, to a viscosity of 320 c.p.s. at 25° C. The product was precipitated with methanol, to produce a solid prepolymer which by chlorine analysis was found to contain 23% by weight of diallyl chlorendate.

To 90 parts of this copolymer was added 10 parts of dialyyl phthalate monomer, 3 parts of t-butyl perbenzoate, 2 parts of lauric acid and 410 parts of methyl isobutyl ketone. With this solution was impregnated 12 plies of 181 Volan A treated glass cloth. The solvent was evaporated, and the layup was pressed at 150° C. and 100 p.s.i. for 30 minutes. The product had a flexural strength of 70,000 p.s.i., was non-burning by ASTM method D635–56T, and had a burning rate of 0.10 inch per minute when tested by method D757–49.

*Example 7*

The following example demonstrates the substantially higher filler loadings that may be employed, for flexural strengths equivalent to comparable compositions containing less filler, when diallyl chlorendate is present in the more highly loaded composition: To 90 parts of the pre-copolymer produced in Example 6 was added 10 parts of diallyl phthalate monomer and 3 parts of t-butyl perbenzoate, and a total of 155 parts of filler consisting of 50 parts of calcium carbonate, 70 parts of titanium-calcium pigment containing 30% titanium dioxide and 70% calcium sulfate, 20 parts asbestos, 10 parts antimony trioxide, 3 parts lead chromate pigment, and 2 parts lauric acid as a mold release agent. The mixture was blended, and compression molded in bars ¼" x ½" x 5" at 300° F. and 8000 p.s.i. for 15 minutes. The product was nonburning by ASTM method D637–56T, and had a burning rate of 0.10 inch per minute by ASTM method D737–49, and exhibited a flexural strength of 7300 p.s.i.

Repeating the above procedure, raising the filler loading to 237 parts, as follows: 110 parts calcium carbonate, 70 parts of titanium-calcium pigment containing 30% titanium dioxide and 70% calcium sulfate, 40 parts asbestos, 10 parts antimony trioxide, 4 parts lead chromate and 3 parts lauric acid, gave the following physical properties: non-burning by ASTM O637–56T, burning rate of 0.09 inch per minute by ASTM D737–49, and flexural strength of 7720 p.s.i.

*Example 8*

Diallyl isophthalate was polymerized as follows: 100 parts of diallyl isophthalate monomer was mixed with 0.15 part of tert.-butyl hydroperoxide and 0.086 part of hydrogen peroxide and heated with stirring at 120° C. for 7.5 hours at which point the reaction mass has reached a viscosity of 350 c.p.s. at 25° C. The polymer was precipitated with methanol, separated and dried to give a 22% yield of solid resin, having a softening range of 55–95° C. and iodine number of 64.

Eighty parts of this diallyl isophthalate prepolymer was mixed with 20 parts of diallyl chlorendate monomer, 10 parts antimony trioxide and 100 parts methyl isobutyl ketone and used to prepare a glass cloth laminate as follows: 12 plies of Garan finish glass cloth were impregnated with this mixture, dried at 250° F. for 5 minutes, to a resin content of 46%, and pressed at 50 p.s.i. and 275° F. for 30 minutes. The panel produced was nonburning by ASTM method D635–56T, and had a flexural strength of 53,800 p.s.i. and flexural modulus of 1,490,000. After 30 minutes at 400° F. the flexural strength was 36,800 p.s.i. and the flexural modulus was 2,140,000.

*Example 9*

A laminating solution was prepared as follows: 45 parts of diallyl isophthalate prepolymer prepared as in Example 8 was blended with 50 parts of diallyl chlorendate monomer and 5 parts of diallyl isophthalate monomer, and mixed with 3 parts of t-butyl perbenzoate and 100 parts of acetone. Twelve plies of 181/Volan glass cloth were impregnated with this solution and dried at 250° F. for 5 minutes. The layup, having a resin content of 45%, was pressed at 50 p.s.i. and 275° F. for 30 minutes. The sample was postcured overnight at 350° F. The panel produced was non-burning by ASTM method D635–56T, and had a tensile strength at room temperature of 34,400 p.s.i., edgewise compressive strength of 50,300 p.s.i., and flexural strength of 71,100 p.s.i. After remaining for 3 hours in boiling water, followed by 1 hour at room temperature, the tensile strength was 33,400 p.s.i. and the edgewise compressive strength was 47,300. After 100 hours at 400° F., the flexural strength was 57,400 p.s.i.

A similarly prepared layup, wherein all the diallyl isophthalate (prepolymer and monomer) was replaced with diallyl chlorendate prepolymer, produced a non-burning cured product which had a room temperature flexural strength of 67,700 p.s.i., but which after 100 hours at 400° F. had deteriorated to 7,000 p.s.i.

In summary, it is seen that the diallyl chlorendate-diallyl phthalate combinations of this invention not only produce compositions which meet strict tests of flame retardancy, but also improve the mechanical properties of the products, evidenced particularly in the heat distortion temperatures and the flexural strengths and the retention of these properties, and also accelerate the rate of cure and permit higher filler loadings as compared with the use of either component alone. These beneficial results are realized when the diallyl chlorendate and diallyl phthalate or isomers thereof are present in a ratio of about five to about fifty parts of diallyl chlorendate per hundred parts of total resin. As previously stated, the diallyl chlorendate may be incorporated into the resin as monomer, prepolymer and/or copolymer. When less than five parts of diallyl chlorendate are present in the resin the flame retardant effect is not sufficiently marked for most commercial requirements. For unfilled compositions, it is preferred to use at least ten parts of diallyl chlorendate per hundred parts total resin. When over about 50% of the resin is derived from the diallyl chlorendate the beneficial effects of the combination are diminished in that the high temperature stability of the product is reduced. For the enhanced flame retardant effect obtained when antimony trioxide is present, about five to twenty parts of antimony trioxide per hundred parts of total resin is preferably used, the amount depending on the particular flammability characteristics desired. When antimony trioxide is present, substantially less diallyl chlorendate need be employed for an equivalent flame retardant effect; on the other hand, antimony trioxide alone with diallyl phthalate resin, in the absence of diallyl chlorendate, is much less effective as a flame retardant.

It is apparent that this invention is susceptible to numerous modifications within the scope of the disclosure, and it is intended to include such variations within the scope of the following claims.

We claim:

1. A polymerizable mixture comprising at least about 50% of a thermoplastic polymer of diallyl phthalate, which polymer contains residual unsaturation and is capable of further polymerization, and diallyl 1,4,5,6,7,7-hexachlorobicyclo-(2.2.1)-5-heptene-2,3-dicarboxylate in a form selected from the group consisting of diallyl 1,4,5,6,7,7 - hexachlorobicyclo-(2.2.1)-5-heptene-2,3-dicarboxylate monomer, thermoplastic polymers thereof, and thermoplastic copolymers thereof with diallyl phthalate, each containing residual unsaturation and being capable of further polymerization, said diallyl 1,4,5,6,7,7-hexachlorobicyclo-(2.2.1)-5-heptene-2,3-dicarboxylate being present in an amount of about 5–50% by weight of the total of polymer plus monomer.

2. A polymerizable mixture comprising at least about 50% of a thermoplastic polymer of diallyl orthophthalate, which polymer contains residual unsaturation and is capable of further polymerization, and about 5–50%, by weight of the total of polymer plus monomer, of diallyl 1,4,5,6,7,7 - hexachlorobicyclo - (2.2.1)-5-heptene-2,3-dicarboxylate as said monomer.

3. A polymerizable mixture comprising at least about 50% of a thermoplastic polymer of diallyl isophthalate, which polymer contains residual unsaturation and is capable of further polymerization, and about 5–50%, by weight of the total of monomer plus polymer, of diallyl 1,4,5,6,7,7 - hexachlorobicyclo - (2.2.1)-5-heptene-2,3-dicarboxylate as said monomer.

4. A polymerizable mixture comprising at least about 50% of a thermoplastic polymer of diallyl phthalate, which polymer contains residual unsaturation and is capable of further polymerization, diallyl 1,4,5,6,7,7-hexachlorobicyclo - (2.2.1)-5-heptene-2,3-dicarboxylate in a form selected from the group consisting of diallyl 1,4,5,6,7,7 - hexachlorobicyclo-(2.2.1)-5-heptene-2,3-dicarboxylate monomer, thermoplastic polymers thereof, and thermoplastic copolymers thereof with diallyl phthalate, each containing residual unsaturation and being capable of further polymerization, said diallyl 1,4,5,6,7,7-hexachlorobicyclo-(2.2.1)-5-heptene-2,3-dicarboxylate being present in an amount of about 5–50% by weight of the total of polymer plus monomer, and a catalytic amount of an organic peroxide.

5. A polymerizable mixture comprising at least about 50% of a thermoplastic polymer of diallyl phthalate, which polymer contains residual unsaturation and is capable of further polymerization, diallyl 1,4,5,6,7,7-hexachlorobicyclo-(2.2.1)-5-heptene-2,3-dicarboxylate in a form selected from the group consisting of diallyl 1,4,5,6,7,7-hexachlorobicyclo-(2.2.1)- 5-heptene-2,3-dicarboxylate monomer, thermoplastic polymers thereof, and thermoplastic copolymers thereof with diallyl phthalate, each containing residual unsaturation and being capable of further polymerization, said diallyl 1,4,5,6,7,7-hexachlorobicyclo-(2.2.1)-5-heptene-2,3-dicarboxylate being present in an amount of about 5–50% by weight of the total of polymer plus monomer, and in admixture therewith about 5–20%, by weight of polymer plus monomer, of antimony trioxide.

6. A polymerizable mixture comprising at least about 50% of a thermoplastic polymer of diallyl orthophthalate, which polymer contains residual unsaturation and is capable of further polymerization, and about 5–50%, by weight of the total mixture of polymer plus monomer, of diallyl 1,4,5,6,7,7-hexachlorobicyclo-(2.2.1)-5-heptene-2,3-dicarboxylate as said monomer; and in admixture therewith about 5–20%, by weight of polymer plus monomer, of antimony trioxide.

7. A polymerizable mixture comprising at least about 50% of a thermoplastic polymer of diallyl isophthalate, which polymer contains residual unsaturation and is capable of further polymerization, and about 5–50%, by weight of the total of polymer plus monomer, of diallyl 1,4,5,6,7,7-hexachlorobicyclo-(2.2.1)-5-heptene-2,3-dicarboxylate as said monomer; and in admixture therewith about 5–20%, by weight of polymer plus monomer, of antimony trioxide.

8. A polymerizable mixture comprising at least about 50% of a thermoplastic polymer of diallyl phthalate, which polymer contains residual unsaturation and is capable of further polymerization, diallyl 1,4,5,6,7,7-hexachlorobicyclo-(2.2.1)-5-heptene-2,3-dicarboxylate in a form selected from the group consisting of diallyl 1,4,5,6,7,7-hexachlorobicyclo-(2.2.1)- 5-heptene-2,3-dicarboxylate monomer, thermoplastic polymers thereof, and thermoplastic copolymers thereof with diallyl phthalate, each containing residual unsaturation and being capable of further polymerization, said diallyl 1,4,5,6,7,7-hexachlorobicyclo-(2.2.1)-5-heptene-2,3-dicarboxylate being present in an amount of about 5–50% by weight of the total of polymer plus monomer, and in admixture therewith, about 5–20%, by weight of polymer plus monomer of antimony trioxide, and a catalytic amount of an organic peroxide.

9. A thermoset resinous composition comprising the polymerization product of diallyl phthalate and diallyl 1,4,5,6,7,7-hexachlorobicyclo-(2.2.1)-5-heptene-2,3-dicarboxylate, wherein about 5–50% by weight of the total polymerization product is derived from said diallyl 1,4,5,6,7,7-hexachlorobicyclo-(2.2.1)- 5-heptene-2,3-dicarboxylate.

10. The thermoset composition of claim 9, wherein said diallyl phthalate is diallyl orthophthalate.

11. The thermoset composition of claim 9, wherein said diallyl phthalate is diallyl isophthalate.

12. A thermoset resinous composition comprising the polymerization product of diallyl phthalate and diallyl 1,4,5,6,7,7-hexachlorobicyclo-(2.2.1)-5-heptene-2,3-dicarboxylate, wherein about 5–50% by weight of the total polymerization product is derived from said diallyl 1,4,5,-6,7,7-hexachlorobicyclo-(2.2.1)-5-heptene-2,3-dicarboxylate, and in admixture therewith about 5–20%, by weight of the total polymerization product, or antimony trioxide.

References Cited in the file of this patent

UNITED STATES PATENTS

| | | |
|---|---|---|
| 2,810,712 | Baranauckas | Oct. 22, 1957 |
| 2,990,388 | Johnston et al. | June 27, 1961 |

OTHER REFERENCES

Delmonte: Plastics, April 1947, pages 39–40.